United States Patent [19]
Hisatake et al.

[11] Patent Number: 5,027,221
[45] Date of Patent: Jun. 25, 1991

[54] DIGITAL IMAGE RECORDING SYSTEM WITH PRESET CONTROL FOR SELECTING OUTPUT FORMATS BASED ON THE SELECTED AMOUNT OF PIXEL COLOR AND DENSITY DATA

[75] Inventors: Masayuki Hisatake; Hiroshi Takayanagi, both of Kanagawa, Japan

[73] Assignee: Fuji Xerox Co., Ltd., Tokyo, Japan

[21] Appl. No.: 595,854

[22] Filed: Oct. 10, 1990

[51] Int. Cl.$^5$ .................. H04N 1/21; H04N 1/29; H04N 1/387; H04N 1/46

[52] U.S. Cl. .................. 358/300; 358/401; 358/444; 358/452; 358/75; 364/518

[58] Field of Search ............ 358/296, 401, 443, 444, 358/448, 452, 453, 455, 75, 300; 364/518, 519, 523

[56] References Cited

U.S. PATENT DOCUMENTS

4,345,276  8/1982  Colomb .

Primary Examiner—George H. Miller, Jr.
Assistant Examiner—Scott A. Rogers
Attorney, Agent, or Firm—Finnegan, Henderson, Farabow, Garrett and Dunner

[57] ABSTRACT

A digital image recording system having an image read section for reading an image on an original, data storage means for storing image data as read by the image read section, and an image output section for outputting the image data read out of the storage means in the form of a hard copy of the document. The digital image recording system comprises transmission data amount select means for switching, for every page, the color and density of each pixel of the image data as read by the image read means and transferred to the storage means. Format select means switch the output format of the data image output section with every page according to the switched transmission data amount. Job entering sets a copy job, such as the type of documents, page order and the number of copies. Control means control the preset processing unit, the amount of transmission data in the data amount select means, and the output format in the output format select means according to input data in the job entering means.

12 Claims, 5 Drawing Sheets

| COPY JOB | DFS | |
|---|---|---|
| NORMAL MODE (MONOCHROMATIC HIGH SPEED MODE) | 0 | 0 |
| MONOCHROMATIC MULTI-GRADATION MODE | 0 | 1 |
| COLOR MODE | 1 | 0 |
| | 1 | 1 |

DIGITAL IMAGE RECORDING SYSTEM WITH PRESET CONTROL FOR SELECTING OUTPUT FORMATS BASED ON THE SELECTED AMOUNT OF PIXEL COLOR AND DENSITY DATA

BACKGROUND OF THE INVENTION

1. Field of the Invention

The present invention relates to a digital image recording system which reads an original image with an optical sensor to provide image data. This digital image recording system also compresses the image data as read, stores it into a recording medium, such as a semiconductor memory, a magnetic disk, etc., and if required, is capable of copying and outputting the image data.

2. Discussion of the Related Art

Recent image recording devices, such as a copying machine, employ digital image processing technology and are capable of many types of edit functions. For example, the image recording devices may perform enlargement/reduction, turning of an image, trimming an image to pick up and output only a desired area in an image, masking to remove only a desired area in an image, color change to change one color to another, and "cut and paste" to pick up an image within a desired area on a document and put that image into a desired area on another document.

In the above mentioned image recording apparatus, it is very frequently required to copy a plurality of documents and to produce a plurality of copies of each document in a preset order of pages. This function of the image recording system will be referred to as a recirculating document handling (RDH) function. In order to realize the RDH function in a conventional image recording apparatus, it is required to repeat, the number of times equal to that of copies, the operation of feeding an original document in an order of pages to obtain one copy. In this case, it takes a very long time, and each sheet of the document must be fed by an automatic document feeder (ADF) the number of times equal to that of copies. This greatly increases the risk that the document will be torn or wrinkled.

Further, with a sorter, each page of an original document is read a predetermined number of times, e.g., N times. Each time an image is read, it is copied onto copy sheets or papers that are discharged into N bins of the sorter in the image record section to obtain a plurality of copies in a predetermined order of pages on the basis of the original document consisting of a plurality of pages. In this case, damages to the document can be limited within the minimum since the document is fed only once. However, bins whose number is equal to that of copies are required, the system will be large-sized in order to obtain a large number of copies. Further, in case where the subsequent processing such as stapling and binding is performed, the processing must be performed in each bin or outside of each bin. Such a processing arises a trouble and prevents an automatization of the system.

Furthermore, where an instruction according to a copy job is incorrect, it is delayed to recognize that because of much time for completing one copy, and a large subsequent adjustment may be required.

Figure 6:
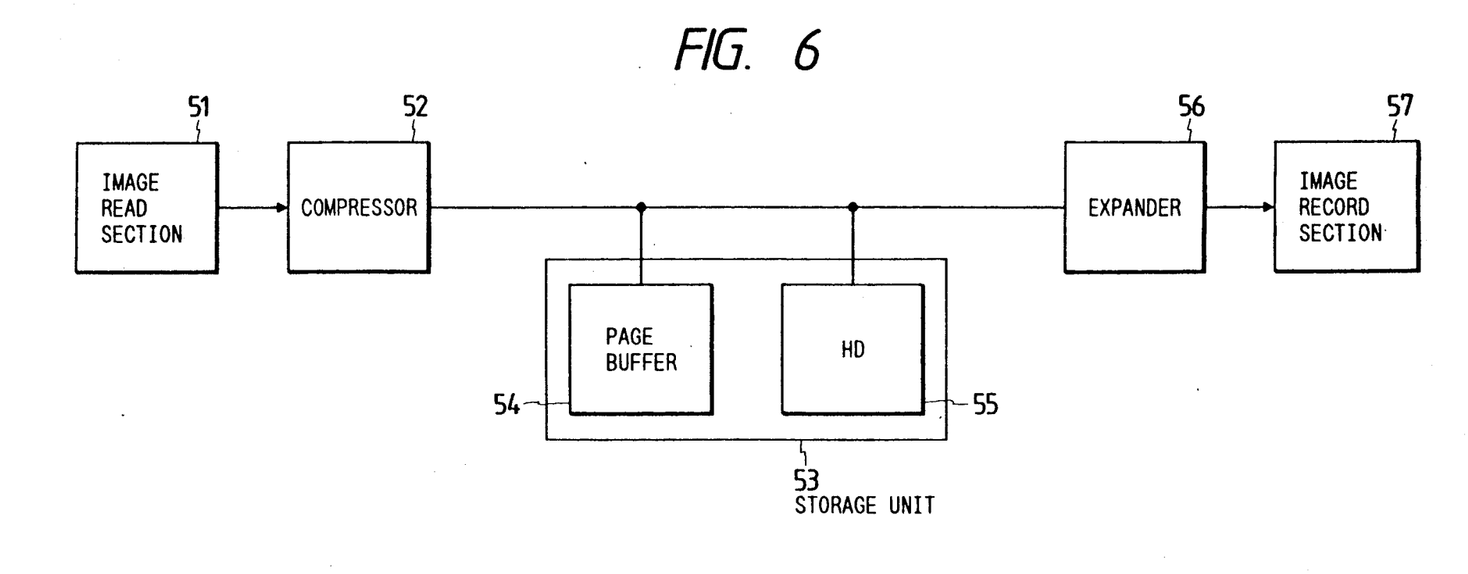
FIG. 6 is a block diagram of a conventional digital image recording system.

A conventional digital image recording system that electronically implements the RDH function is shown in FIG. 6.

Ige data outputted from an image read section 51 is applied to a compressor 52 where it is compressed by a specified amount. The compressed data is then written into a page buffer 54 of a storage unit 53. The storage unit 53 preferably has a large memory capacity in order to store image data for a large number of documents. Usually, a magnetic memory, such as a hard disk (HD) 55, is used as shown. The access time of the HD 55 is about 1 Mbyte/sec. This access time differs from the transfer speed of the input image data. The page buffer 54 is provided to cop with the speed difference.

The compressed data temporarily stored in the page buffer 54 is sequentially stored into the HD 55. After the image data of the set of documents is completed, the image data stored in the HD 55 is read out page by page, and stored into the page buffer 54. After a preset amount of image data is stored, an expander 56 sequentially fetches the compressed image data from the page buffer 54, decodes (expands) the fetched image data, and outputs the decoded image data to an image record section 57. In the final stage, the image record section 57 produces a hard copy.

With such an arrangement, images on a number of documents are read one time, and the image data, as read, is stored into the HD 55. Then, the image data is read out of the HD 55 page by page. In this way, a number of documents are copied, and a desired number of copies of each document is output in a desired order. Thus, the RDH function can be electronically realized, providing easy copying.

There are many types of documents to be copied, such as character documents to be expressed in only two gray levels, black and white; photographic documents to be expressed in multiple gray levels (referred to as a multi-gradation); and documents in which only a specific area or areas must be colored for emphasis purposes. The character document must be outputted at a high speed. The photograph document must be outputted with a high picture quality even if there is a slight sacrifice in the copy rate.

In the conventional image data recording system shown in FIG. 6, the amount of image data outputted from the image read section 51 is fixed. For example, the data amount per pixel is fixed at M bits, and therefore process speed is fixed. Accordingly, the above documents may not be copied properly by the above described image recording apparatus.

To cope with these problems, the following solutions have been proposed. To speed up the data transfer, the number of bits for one pixel is set to be as small as possible, for example, 2 bits for one pixel. However, if the number of bits per pixel is 2, photographs cannot be copied with high quality. To improve the picture quality, the number of bits for one pixel must be increased, for example, to 8 bits for one pixel. This can improve the picture quality, but reduces the effective data transfer speed, and bits are used unnecessarily for processing an image of a document that could have been expressed with a smaller number of bits.

SUMMARY OF THE INVENTION

An object of the present invention is to provide a digital image recording system that can electronically realize the RDH function, and can copy and output various documents at high speed.

Another object where the present invention to provide a digital image recording system for documents requiring high picture quality where the number of bits of image data per pixel is increased or apportioned according to gradation data or color flag data.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises a digital image recording system having an image read section for reading an image from an original and generating image data including transmission data representing at least the color and density of the original document, data storage means for storing image data read by the image read section and for receiving the transmission data, and an image output section for outputting the image read out of the data storage means in the form of a hard copy, the output image data having one of a plurality of formats, at least one of the formats determines a number of bits of gradation data per pixel of the output image, at least another one of the formats determines a number of bits of color data per pixel of the output data.

The digital image recording system further comprises: a preset processing unit for performing at least one editing function on the image data, transmission data amount select means receiving the edited image data and generating an amount of data corresponding to the transmission data in response to the edited image data, the transmission data amount select means further selecting a length of the amount of data, output format select means receiving said amount of data and selecting the format of the output image in response to the amount of data, job entering means for setting a copy job in response to information input thereto, wherein a copy job at least includes one of the functions of setting the type of the original document setting a page order of the original document, and setting a number of copies to be made; and control means for controlling the preset processing unit, the transmission data amount select means, and the output format select means in response to the information inputted to the job entering means.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the present invention and together with the description serve to explain the principles of the invention.

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

Figure 1:
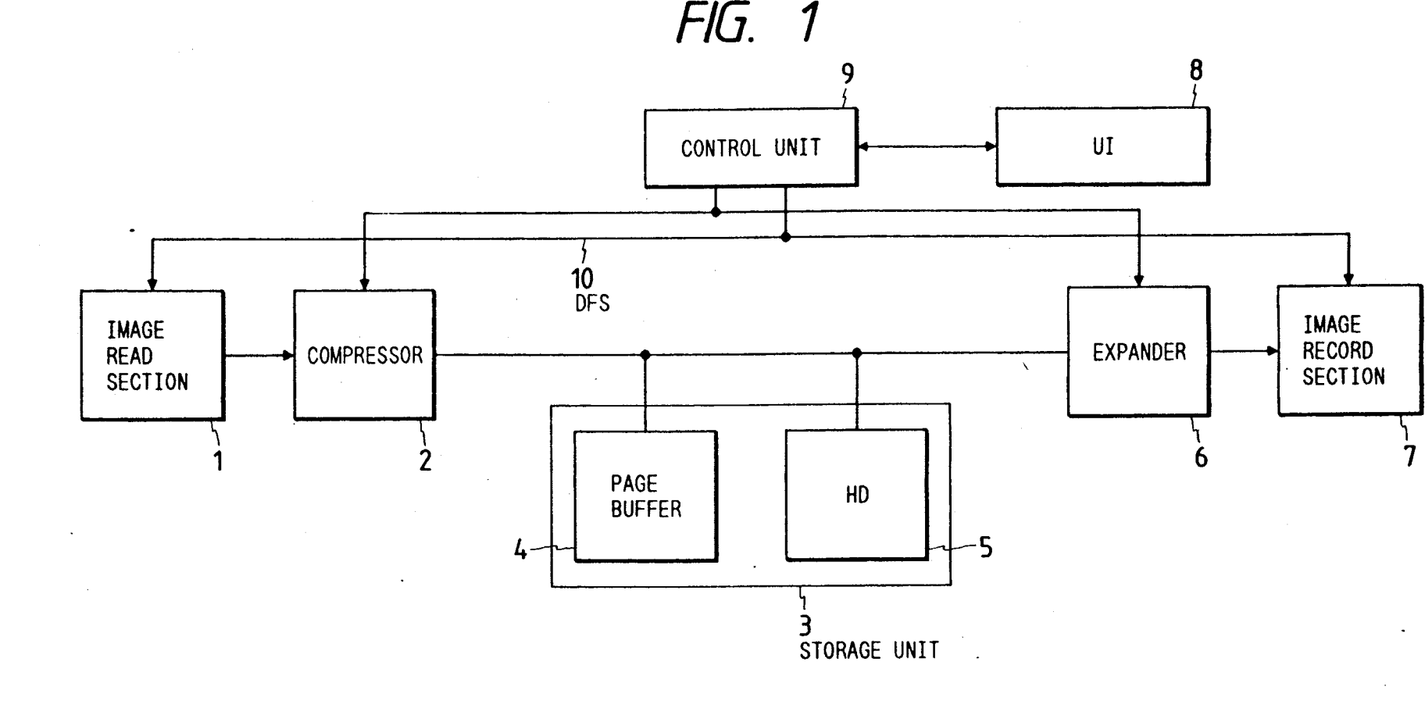
FIG. 1 is a block diagram of a digital image recording system according to an embodiment of the present invention.

A digital image recording system according to the present invention, as shown in FIG. 1, includes an image read section 1, a compressor 2, a storage unit 3, an expander 6, an image record section 7, a user interface (UI) 8, and a control unit 9. The control unit 9 generates a data format designating signal (DFS) to determine a format of image data according to a copy job as set at the UI 8. The control unit 9 transfers the DFS 10 to the image read section 1 and the image record section 7.

Consider a case that the maximum number of bits per pixel is limited to 4 bits by the data width of a data bus of the digital image recording system. When copy job instructions are input at UI 8 to copy and output documents in multiple gray levels, the control unit 9 detects the copy job. The control unit also generates a DFS 10 to instruct the assignment of all of the four bits to gray level or gradation data, and sends the DFS 10 to the image read section 1 and the image output section 7. As a result, the document can be copied in 16 gray levels.

When copy job instructions are input at the UI 8 to copy and output documents requiring low picture quality and high speed, the control unit 9 detects the copy job. The control unit 9 also generates a DFS 10 to format the image data to have the structure of 2 bits per pixel, and sends the DFS 10 to the image read section 1 and the image output section 7. As a result, the amount of data per pixel is reduced and the data transfer speed is increased.

When a copy job is input requiring color reproduction, the control unit 9 generates a DFS 10 to assign 2 bits to color flags, and two bits to gradation data. The control unit also transfers the DFS 10 to the image read section 1 and the image record section 7. The result is a copy of the document in the desired color. This type of copy job includes a copy job to copy a document containing a color other than black, and a copy job to paint out a desired area on the original document with a given color.

Figure 2:
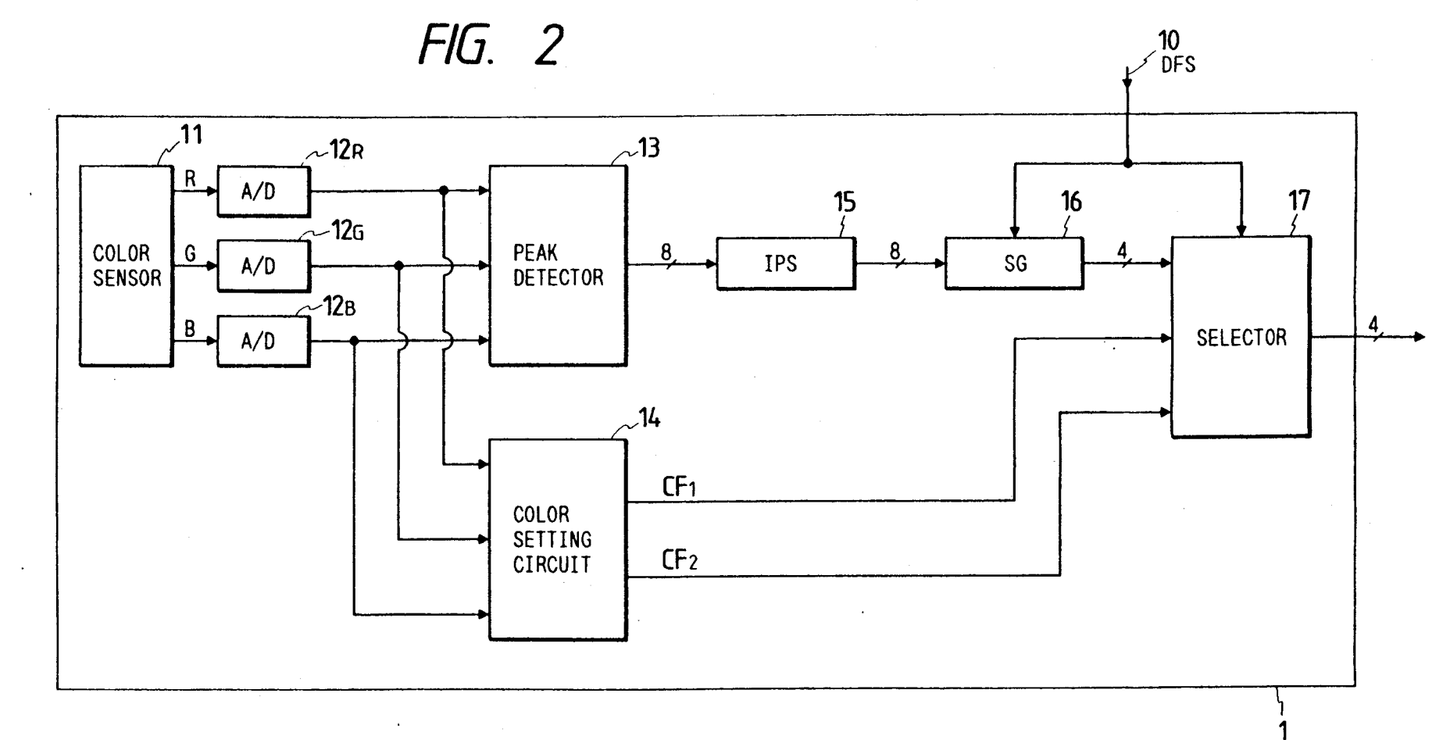
FIG. 2 is a block diagram of a color sensor used in the system of FIG. 2.

In FIG. 1, an image read section 1 reads an image on an original (i.e., a document) by a color sensor, and outputs the image information read therefrom in the form of digital image data. A specific arrangement of the image read section 1 is shown in FIG. 2. A color sensor 11 includes a CCD line sensor with transmission type color filters of red (R), green (G), and blue (B). The color sensor 11 also includes a driver for driving the line sensor, and adjustment circuits for offset and gain adjustment, shading correction, etc. Three analog color signals corresponding to the three primary colors R, G and B outputted from the color sensor 11 and are inputted to A/D converters $12_R$, $12_G$, and $12_B$. In those A/D converters, the analog color signals are converted into digital color signals of a given number of bits, e.g., 8 bits. Then, those digital color signals are input to a peak detector 13 and a color setting circuit 14. The peak detector 13 selects the color signal whose density information is the largest (or luminance is the smallest). The selected color signal is treated as density data to indicate the density of the pixel, and is transferred to an image processing system (IPS) 15. The IPS 15 applies preset image processing to the density data of 8 bits, to perform an editing function such as document size detection, enlargement/reduction, trimming, masking, etc.

A screen generator (SG) 16 receives the edited 8-bit density data from the IPS 15 and a DFS 10 from the control unit (not shown in FIG. 2), and converts the 8-bit density data into 4-bit density data according to the DFS 10. The data conversion can be readily realized by a multi-value error diffusion method. Thus, the DFS 10 instructs SG 16 to convert 8-bit image data into 4-bit image data. The DFS 10 can also instruct SG 16 to convert 8-bit image data into 2-bit image data. In the conversion to the 2-bit data, the selected data comprises bits from the lower order bit positions of the 8-bit image data.

Figure 3:
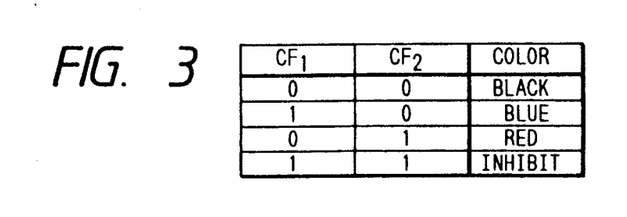
FIG. 3 is a table showing color flags and copy colors.

The color setting circuit 14 has at least two functions. One function is to receive the three digital color signals, discriminate a color of the pixel, and set a color flag. The color setting circuit also receives an instruction from the control unit 9 and sets a color flag indicative of a given color in a given area on the document. In the system shown in FIG. 2, two color flags $CF_1$ and $CF_2$ are used. As shown in FIG. 3, for black, $CF_1=CF_2=0$; for blue $CF_1=1$ and $CF_2=0$; for red, $CF_1=0$ and $CF_2=1$. $CF_1=1$ and $CF_2=1$ indicates "inhibit". The contents of the table of FIG. 3 is illustrated by way of example, and it is evident to those skilled in the art that other contents are available.

Figure 5A:
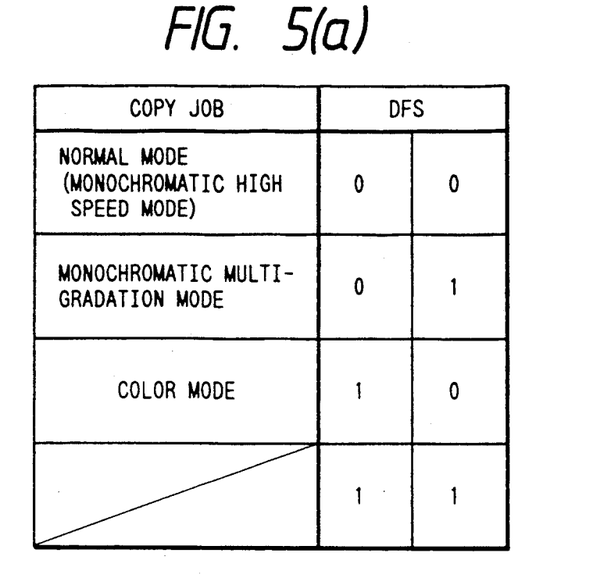
FIGS. 5(a) through 5(d) are diagrams showing examples of DFS and corresponding data formats.

The density data from the SG 16 and the color flags from the color setting circuit 14 are input to a selector 17. In the selector circuit 17, items of data are combined, according to the DFS 10 generated by the control unit 9, into image data in which 4 bits are used for expressing one pixel. Namely, the selector 17 selects among the gradation data from the SG 16 and the color flags $CF_1$ and $CF_2$ from the color setting circuit 14 on the basis of the DFS 10, to generate the final image data. With the DFS 10 defined as shown in FIG. 5(a), when the DFS 10 transferred from the control unit 9 indicates "1X" (where X is 0 or 1), the selector 17 fills in the upper two bits of 4-bit gradation data from the SG 16 with the color flags $CF_1$ and $CF_2$. Such an operation can be performed by activating a 2 to 1 selector in response to the upper bit of the DFS 10.

The compressor 2 is operable in two modes, a compress mode and a through mode. In the compress mode, the image data is compressed by an adaptable prediction encoding system. In the adaptable predictive coding system, the image data is predicted every pixel by a plural kinds of predictors provided in the compressor 12. If the production is true, "0" is assigned to the pixel signal and the predictor is used continuously. On the other hand, if the prediction is untrue, "1" is assigned to the pixel signal and the predictor to be used is changed in a predetermined order. The compressed data is decompressed or expanded into the original image data by the decompressor 14 including a plural kinds of reverse predictors. The compress mode or the through mode is selected by a command from the control unit 9.

The storage unit 3 for storing the data from the compressor 2 is made up of a page buffer 4 and an HD 5, as in the conventional digital image recording system.

The expander 6 is also operable in two modes, an expand mode and a through mode. In the expand mode, the expander 6 expands the compressed data into the original image. In the through mode, the expander 6 directly outputs the image data as received, without an expanding operation. A command from the control unit 9 selects the expand mode or the through mode of the expander 6.

The compress/expand mode and the through mode are selectively used in the following way. When the number of copies is set at one, there is no need to compress and store the image data. Accordingly, the control unit 9 sends a command to set up the through mode to the compressor 2 and the expander 6. Under this condition, the image data from the image read section 1 passes through the compressor 2 and the expander 6 without being compressed and expanded, and enters the image record section 7.

When a plurality of copies or the RDH function is designated, the control unit 9 sets the compressor 2 and the expander 6 respectively in the expand mode and the compress mode. In this case, the image data from the image read section 1 is compressed by the compressor 2 and stored into the storage unit 3. Then, the image data is read out of the storage unit 3 page by page, and applied to the expander 6. The expander 6 expands the image data to the original data, and sends it to the image output section 7. In this case, only one read operation is required. The image record section 7 receives the image data from the expander 6, and records the original image.

Figure 4:
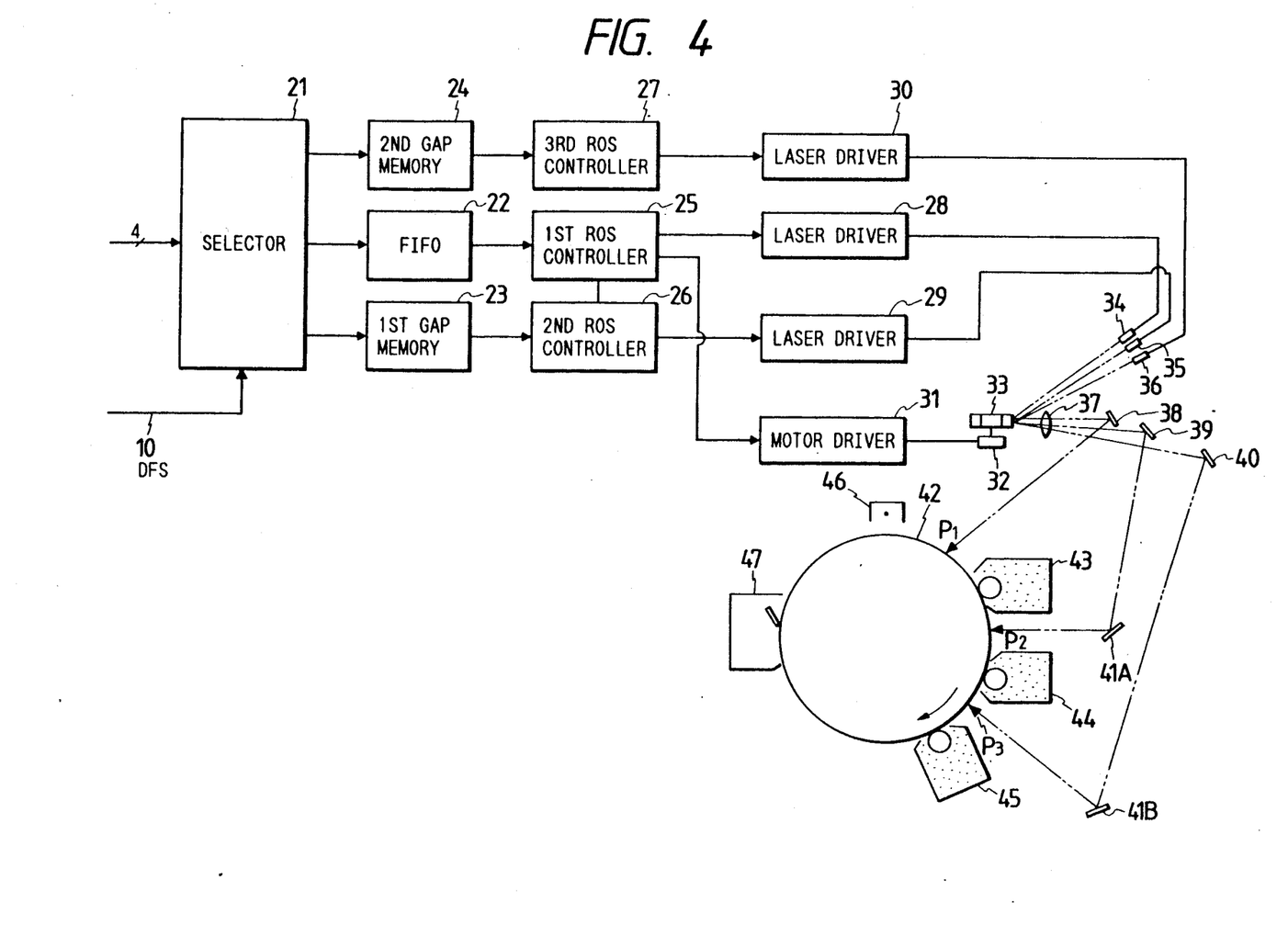
FIG. 4 shows in block and schematic form an arrangement of an image recording section used in the embodiment of FIG. 1.

FIG. 4 shows a selector 21, a shift register 22, a first gap memory 23, a second gap memory 24, a first ROS (raster output scan) controller 25, a second ROS controller 26, a third ROS controller 27, laser drivers 28–30, motor drivers 31, a motor 32, polygon mirror 33, lasers 34–36, a lens 37, reflecting mirrors 38, 39, 40 41A and 41B, a photoreceptor 42, a black developing unit 43, a first color developing unit 44, a second color developing unit 45, and a cleaner 47. In this instance, the first and second color developing units 44 and 45 are for blue and red color development. The developing system of the image output section is known as the plus 2 color developing type in which two colors can be developed in addition to black. Color developing units for colors other than the above can be set to the image output section 7. Further, if required, the color developing units may be removed, and the black developing unit can be used instead.

In FIG. 4, the selector 21 determines which one of the first to third ROS controllers 25–27, is to receive 4-bit image data from the expander 6. The selector 21 selects an ROS controller on the basis of the DFS 10 as transferred from the control unit 9. When the DFS indicates something other than "1X", all the image data is transferred to the first ROS controller 25 through the FIFO 22. When the DFS indicates "1X", the upper two bits of the image data is used as a select signal and the lower 2 bits of the image data is distributed every pixel to a ROS controller corresponding to a recording section designated by the select signal. In this case, gradation data indicating the white level is inserted into an ROS controller to which no data has been distributed. Further, this sync signals of the main direction and the subsidiary scan direction are always transferred to the first ROS controller 25.

The above operations will be described concretely hereinafter. When the DFS 10 indicates a copy job for black and white or monochrome, the selector 21 transfers the density data of all of the image data through the FIFO 22 as a buffer memory to the first ROS controller 25. The first ROS controller 25 transfers the gradation data to the laser driver 28 upon the receipt. Under this condition, the laser 34 is driven by a signal that expresses a given number of gray levels. At this time, the polygonal mirror 33 rotates in snychrony with a sync signal from the first ROS controller 25. Then, the laser beam emitted from the laser 34 is reflected by the polygonal mirror 33, travels through the lens 37 and the reflecting mirror 38, and illuminates a first reference position denoted as $P_1$ in the figure. An electrostatic latent image is formed at the position $P_1$ line by line. The latent image is developed by the developing unit 43 and transferred onto a copy sheet or paper (not shown). The developed image is then fused or fixed by a fuser (not shown), and the copy sheet is discharged from the image recording system. As a matter of course, the photoreceptor 42 is rotated at a preset speed.

When the DFS 10 indicates a color copy job, the selector 21 interprets the color flags contained in the image data, and operates int he following manner. For example, as shown in FIG. 3, the gradation data containing the color flags, $CF_1 = CF_2 = 0$, is transferred to the first ROS controller 25. The gradation data containing the color flags, $CF_1 = 1$ and $CF_2 = 0$, is transferred to the second ROS controller 26. The gradation data containing the color flags, $CF_1 = 0$ and $CF_2 = 1$, is transferred to the third ROS controller 27. If a black image is outputted, operations similar to the above ones are performed. A color image is outputted in the following manner. A laser beam from the laser 35 is reflected by the polygonal mirror 33, and passes through the lens 37 and the reflecting mirrors 39 and 41A to illuminate a second position denoted as $P_2$. Further, the laser beam from the laser 36 is reflected by the polygonal mirror 33, and passes through the lens 37 and the reflecting mirrors 40 and 41B, and illuminates a third position denoted as $P_3$. In this way, electrostatic latent images are formed at the second and third positions $P_2$ and $P_3$. The latent images are respectively developed by the developing units 44 and 45, and transferred onto a copy paper, fixed by the fuser, and finally output in the form of color hard copy. The first and second gap memories 23 and 24 are provided to accommodate for the time required by the photoreceptor 42 to turn from the position $P_1$ to the position $P_2$, and from the position $P_1$ to the position $P_3$.

The image record section 7 thus arranged can produce a color copy for each rotation of the photoreceptor 42. In this respect, high speed copying can be achieved.

The UI 8 prepares copy jobs by setting the number of copies, paper size, desired edit, etc. UI 8 contains a display device and a control panel, and further includes an edit pad for designating a specific area to be edited. Also, the present invention in the preferred embodiment allows for the user to select via the UI 8 the image data format on a page by page basis within a single job, and therefore, to select the number of bits used to convey the gradation data on a page by page basis within a single job.

For example, the user could designate a first data format for the first page of a 5 page job and a second data format for the last 4 pages of the 5 page job. This feature provides the advantage of high speed operation with jobs including both character image data and photographic image data and also the advantage of allowing the user to select the data format and other various copying parameters for a plurality of jobs at the same time.

Furthermore, the preferred embodiment allows the user to select via UI 8 the image data format on a job by job basis. For example, the user could designate a first data format for a fifst job and a second data format for a second job.

The control unit 9 contains a suitable microcomputer that controls the operations of the related sections and units in the digital image recording system in a supervisory manner. In this instance, it generates a DFS 10 to determine the format of the image data, according to a copy job as prepared by the UI 8, and sends it to the image read section 1 and the image record section 7.

The operation of the digital image processing system shown in FIG. 1 will be described.

First of all, a user designates with a UI 8 a copy job to make a color copy, to make an ordinary black and white (monochromatic) copy, or to make a monochromatic multi-gradation copy, for a job unit. Where, the job unit means a unit capable of copying in the same copy mode. For example, in case where only one sheet of an N-color document is included in a monochromatic character document having a plurality of pages, copies can be made for all sheets of the documents by designating an N-color recording as a copy job, to constitute a job unit. However, in case where a color document requiring the N-color recording and a picture or photograph document requiring the multi-gradation recording are combined, a copy job for each document must be designated, which is a job unit, since there is no copy job which satisfies the above two requirements simultaneously.

A copy job designated for each job unit in this way is transferred from the UI 8 to the control unit 9. Then, the control unit 9 interprets the contents of the copy job to generate the DFS 10, and transfers the DFS 10 to the image read section 1 and the image record section 7.

The DFS 10 has various settings. For example, as shown in FIG. 5(a), it can consist of two bits. For a copy job of a multi-gradation monochromatic copy, an DFS 10, of "01" is used for designating the multi-gradation monochromatic mode. For a color copy job, "10" is used for designating a color mode. In other copy jobs, a normal mode (monochromatic high speed mode) may be expressed by "00".

These modes can be readily selected by, for example, installing on the UI 8 one control button to set up the monochromatic multi-gradation mode and another control button to set up a color mode. When the control button for the monochromatic multi-gradation is pushed, the control unit 9 interprets a copy job from the UI 8, and generates a DFS 10 of "01". When the control button for the color mode is pushed, the control unit 9 generates a DFS 10 of "10". In the normal mode, it generates a DFS 10 of "00".

In the above description, the multi-gradation copy and the color copy are treated as special cases. Alternatively, the color copy may be treated as a normal case, while the high speed copy and the multi-gradation copy are special cases. Essential to the invention is that the DFS be selected according to the copy mode as set, irrespective of any methods employed. A DFS 10 of "11" will never occur in this instance.

After determining the contents of the DFS 10, the control unit 9 sends the DFS 10 to the SG 16, selector 17, and the selector 21 of the image record section 7.

Figure 5B:
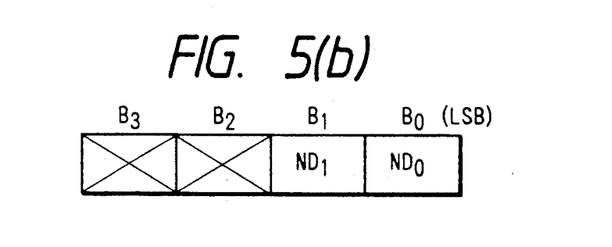
Figure 5C:
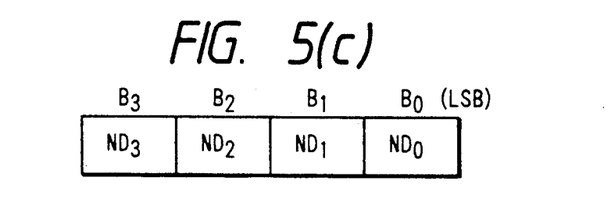
Figure 5D:
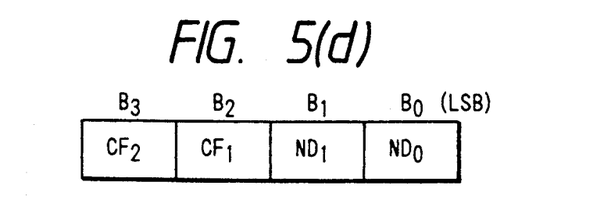

When DFS=00, the SG 16 converts the 8-bit image data from the IPS 15 into 2-bit image data. The selector 17 fills the 2-bit density data will bitefrom the lower order bit positions with bits, as shown in FIG. 5(b), and outputs the 2-bit density data as image data. In this case, the bits at the bit positions $B_2$ and $B_3$ (MSB) are not used. In addition, the color flags $CF_1$ and $CF_2$ output from the color setting circuit 14 are made invalid. The selector 21 delivers all of the received image data to the first ROS controller 25. In FIGS. 5(b) to 5(d), ND indicates density data.

As described above, in the normal mode, one pixel is expressed by 2 bits. Accordingly, the amount of data is small, and hence the copy speed is increased. If required, one bit may be used for one pixel. In this case, the picture quality is degraded, but thin characters are legible. Consequently 2 bits are used for one pixel in this instance.

When DFS=01, the SG 16 converts the 8-bit density data derived from the IPS 15 into 4-bit density data, and applies the 4-bit density data to the selector 17. The selector 17 fills the lower order bit positions of the 4-bit density data with data bits, as shown in FIG. 5(c), and outputs it in the form of image data. In this case, the color flags $CF_1$ and $CF_2$ output from the color setting circuit 14 are mode invalid. The selector 21 delivers all of the received image data to the first ROS controller 25.

Since one pixel consists of four bits in the multi-gradation mode, the copying speed is slower than in the normal mode. However, the copy is performed in 16 gray levels, and hence the picture quality of the reproduced image is excellent. Therefore, this mode is suitable for copying photographs, for example.

When DFS 10=10, the SG 16 converts the 8-bit density data into 2-bit density data. Then, as shown in FIG. 5(d) the selector 17 fills the 2-bit data with data bits from the lower order bit positions of the 8-bit density data. The color flags from the color setting circuit 14 are assigned to the upper two bit positions, to form image data. The selector 21 separates the received image data into the density data and the color flags. Then, it delivers the density data to the corresponding ROS controller, in accordance with the color flags, as mentioned above.

As described above, in the color mode, the data is structured such that four bits are used for one pixel, with two bits specifying density data and two bits specifying color flags. Accordingly, the copying speed is slow, but a desired color copy can be made.

In the embodiment described above, the peak detector is used for selecting density information of the pixel. Alternatively, the digital green signal may be used for the same purposes.

In the above described embodiment, two bits are used for the color flags, because the image output section 7 is a plus 2 color system. The number of bits may be determined by the number of bits for one pixel as determined by, for example, the data bus, the minimum required number of gray levels, and the number of color developing units that can be set tot he image output section.

Furthermore, the sync signal can be transferred by using a communication line, other than that used for the image data. However, the above described embodiment, the sync signal, together with the image data, is transferred by the same line.

As seen from the foregoing description, the data structure of the image data is determined according to a copy job as set up, within the maximum number of bits as limited by the data bus. Therefore, the digital image recording system according to the present invention is capable of high-speed copying, multi-gradation copying, and color copying. Thus, high copy performance is achieved at little cost.

Further according to the present invention, the limited data width and memory capacity of the storage unit can be fully utilized.

It will be apparent to those skilled in the art that various modifications and variations can be made in the digital image recording system of the present invention and in the construction of this digital image recording system without departing from the scope or spirit of the invention.

Other embodiments of the invention will be apparent to those skilled int he art from consideration of the specification and practice of the invention disclosed herein. It is intended that the specification and examples be considered as exemplary only, with a true scope and spirit of the invention being indicated by the following claims.

What is claimed is:

1. A digital image recording system having an image read section for reading an image from an original document and generating image data, transmission data constituting a portion of the image data concerning at least a color and density of the image of the original document, data storage means for storing image data as read by the image read section and receiving the transmission data, and an image output section for outputting the image read out of the data storage means in the form of a hard copy, the output image data having one of a plurality of formats, at least one of the formats determines a number of bits of gradation data per pixel of the output image, at least another one of the formats determines a number of bits of color data per pixel of the output data, the digital image recording system comprising:

a preset processing unit for performing at least one editing function on the image data to provide edited image data;

transmission data amount select means for receiving said edited image data and generating an amount of data corresponding to said transmission data in response to said edited image data, said transmission data amount select means further selecting a length of said amount of data;

output format select means receiving said amount of data and selecting the format of the output image in response to said amount of data;

job entering means for setting a copy job in response to information input thereto, wherein a copy job at least includes one of the functions of setting the type of the original document, setting a page order of the original document, and setting a number of copies to be made; and control means for controlling said preset processing unit, said transmission data amount select means, and said output format select means in response to said information inputted from said job entering means.

2. A digital image recording system according to claim 1, in which the copy job further comprises a multi-gradation function, said multi-gradation function being entered from said job entering means, said control means for increasing said length of said amount of data and selecting said output format to increase the number of bits of gradation data for each pixel.

3. A digital image recording system according to claim 1, in which the copy job further comprises a high speed copying function that is entered from said job entering means, said control means for decreasing said length of said amount of data and selecting said output format to decrease the number of bits per pixel.

4. A digital image recording system according to claim 1, in which the copy job further comprises a color copying function entered from said job entering means, said control means for increasing said length of said amount of data and selecting said output format to increase the number of bits of color data per pixel.

5. A digital image recording system according to claim 1, in which said control means forms a data format designating signal in response to data entered from said job entering means, and transfers the data format designating signal to said transmission data amount select means and said output format select means.

6. A digital image recording system having an image read section for reading an image from an original document and generating image data, transmission data constituting a portion of the image data concerning at least a color and density of the original document, data storage means for storing image data as read by the image read section and receiving the transmission data, and an image output section for outputting the image data read out of the data storage means in the form of a hard copy, the output image having one of a plurality of formats, at least one of the formats determining a number of bits of gradation data per pixel of the output image, at least another one of the formats determining a number of bits of color data per pixel of the output data, the digital image recording system comprising:

a preset processing unit for performing at least one editing function on said image data to produced edited image data;

transmission data amount select means receiving said edited image data and generating an amount of data corresponding to transmission data in response to said edited image data, said transmission data amount select means further selecting a length of said amount of data;

output format select means receiving said amount of data and selecting the format of the output image in response to said amount of data;

job entering means for setting a copy job in response to information input thereto, wherein a copy job at least includes one of the functions of setting the type of the original document, setting a page order of the original document, and setting a number of copies to be made;

control means for controlling said preset processing unit, said transmission data amount select means, and said output format select means in response to said information input from said job entering means;

data compressing means for compressing the image data; and expanding means for expanding the image data compressed by the compressing means.

7. A digital image recording system according to claim 6, in which the copy job further comprises a multi-gradation function entered from said job entering means, said control mans for increasing said length of said amount of data and selecting said output format to increase the number of bits of gradation data for each pixel.

8. A digital image recording system according to claim 6, in which the copy job further comprises a high speed copying function that is entered from said job entering means, said control means for decreasing said length of said amount of data and selecting said output format to decrease the number of bits per pixel.

9. A digital image recording system according to claim 6, in which the copy job further comprises a color copying function entered from said job entering means, said control means for increasing said length of said amount of data and selecting said output format to increase the number of bits of color data per pixel.

10. A digital image recording system according to claim 6, in which said control means forms a data format designating signal in response to data entered from said job entering means, and transfers the data format designating signal to said transmission data amount select means and said output format select means.

11. A digital image recording system having an image read section for reading an image on an original document and generating image data, transmission data constituting a portion of said image data concerning at least a color and density of the original document, data storage means for storing image data as read by the image read section and receiving the transmission data, and an image output section for outputting the image data read out of the storage means in a prescribed order of pages in the form of a hard copy output document of the original document, the digital image recording system comprising:

transmission data amount select means generating an amount of data corresponding to the transmission data and selecting a length of said amount of data;

output format select means receiving said amount of data and selecting the format of the output image in response to said amount of data;

job entering means for setting a copy job in response to information input thereto, wherein a copy job at least includes one of the functions of setting the type of the original document, setting a page order of the original document, and setting a number of copies to be made; and control means for controlling for every page of the output document the transmission data in said transmission data amount select means and the output format in said output format select means in response to said information input from said job entering means.

12. A digital image recording system having an image read section for reading an image on an original document and generating image data, transmission data constituting a portion of the image data concerning at least a color and density of the original document, data storage means for storing image data as read by the image read section and receiving the transmission data, and an image output section for outputting the image data read out of the storage means in a prescribed order of pages, in the form of a hard copy output document of the original document, the digital image recording system comprising:

transmissions data amount select means generating an amount of data corresponding to the transmission data and selecting a length of said amount of data;

output format select means receiving said amount of data and selecting the format of the output image in response to said amount of data;

job entering means for setting a copy job in response to information input thereto, wherein a copy at least includes one of the functions of setting the type of the original document, setting a page order of the original document, and setting a number of copies to be made;

control means for controlling for every page of the output document the transmission data in said transmission data amount select means and the output format in said output format select means in response to said information input from said job entering means;

data compressing means for compressing the image data as read by the image read section; and data expanding means for expanding the image data as compressed by the data compressing means.

* * * * *

UNITED STATES PATENT AND TRADEMARK OFFICE
CERTIFICATE OF CORRECTION

PATENT NO. : 5,027,221

DATED : June 25, 1991

INVENTOR(S) : Masayuki Hisatake et al.

It is certified that error appears in the above-identified patent and that said Letters Patent is hereby corrected as shown below:

Claim 7, column 11, line 67, change "mans" to --means--.

Claim 12, column 12, line 63, change "transmissions" to --transmission--.

Signed and Sealed this

Thirteenth Day of April, 1993

Attest:

STEPHEN G. KUNIN

Attesting Officer

Acting Commissioner of Patents and Trademarks